United States Patent [19]

Van Meeteren et al.

[11] Patent Number: 5,690,985
[45] Date of Patent: Nov. 25, 1997

[54] 2-ELAIDOYLTRIACYLGLYCEROL AS A TEMPERING ACCELERATOR IN AN EDIBLE EMULSION SPREAD

[75] Inventors: Johanna Antonia Van Meeteren, Vlaardingen; Leendert Hendrik Wesdorp, Schiedam, both of Netherlands

[73] Assignee: Van Den Bergh Foods Co., Division of Conopco, Inc., Lisle, Ill.

[21] Appl. No.: 729,893

[22] Filed: Oct. 15, 1996

Related U.S. Application Data

[63] Continuation of Ser. No. 289,043, Aug. 11, 1994, abandoned, which is a continuation of Ser. No. 16,479, Feb. 10, 1993, abandoned, which is a continuation of Ser. No. 830,084, Feb. 3, 1992, abandoned.

[30] Foreign Application Priority Data

Feb. 4, 1991 [GB] United Kingdom .................. 9102349

[51] Int. Cl.$^6$ ..................................... A23D 7/02
[52] U.S. Cl. ........................... 426/601; 426/607; 426/610
[58] Field of Search ................................. 426/610, 607, 426/601

[56] References Cited

U.S. PATENT DOCUMENTS

| | | |
|---|---|---|
| 4,045,588 | 8/1977 | Wieske . |
| 4,568,556 | 2/1986 | McCoy ................................. 426/603 |

FOREIGN PATENT DOCUMENTS

| | | |
|---|---|---|
| 0232590 | 8/1987 | European Pat. Off. . |
| 0294974 | 12/1988 | European Pat. Off. . |
| 2660160 | 10/1991 | France . |
| 02189395 | 1/1989 | Japan . |
| 1564363 | 12/1976 | United Kingdom . |

OTHER PUBLICATIONS

CA 100828x Properties of 2-oleodipalmiten, 2-elaidodipalmiten and some of their mixtures.

Severn 1979 Bailey's Industrial Oil and Fat Products vol. 1. Fourth Ed. Wiley–Interscience John Wiley & Sons New York pp. 29, 44.

Ng, W. et al. "A Kinetic Study on Isothermal Crystallization of Palm Oil by Solid Fat Content Measurements", JAOCS, V. 71, #10, Oct. 1994, pp. 1135–1139.

Bailey's Industrial Oil and Fat Products, vol. 3, ed. Thomas Applewhite, 60, 64.

Gunstone, F.D. et al., "The Lipid Handbook", pp. 59, 60 (London New York).

Bailey's Industrial Oil and Fat Products, vol. 2, Fourth Ed. (1982) pp. 13–14.

Lovegren, NV et al., Properties of 2-Oleodipalmitin, 2-Elaidodipalmitin and Some of their Mixtures, Journal of the American Oil Chemists' Soc., vol. 48 (Mar. 1971) pp. 116–120.

Journal of Food Science, vol. 47, No. 1, 1982, Chicago, Ill. pp. 36–39.

N. Matsui, Crystallization and Polymorphism of Fats and Fatty Acids, ed. by N. Garti and K. Sato (NY, 1988) pp. 410–412).

*Primary Examiner*—Carolyn Paden
*Attorney, Agent, or Firm*—Matthew Boxer

[57] ABSTRACT

A process of forming a liquid edible emulsion spread and the product itself is described. A tempering accelerator in an amount of from 2–10% by weight incorporated in a fat blend. The accelerator is preferably 2-elaidoyl triacylglycerol.

6 Claims, No Drawings

2-ELAIDOYLTRIACYLGLYCEROL AS A TEMPERING ACCELERATOR IN AN EDIBLE EMULSION SPREAD

RELATED APPLICATIONS

This is a continuation application of Ser. No. 08/289,043, filed Aug. 11, 1994, now abandoned, which is a continuation of 08/016,479, filed Feb. 10, 1993, now abandoned, which is a continuation of 07/830,084, filed Feb. 3, 1992, now abandoned.

FIELD OF THE INVENTION

The present invention relates to improvements in edible fats, and in particular to improvements in fat blends suitable for the manufacture of margarines and other spreads. The invention further relates to a process for the manufacture of edible fat spreads and to a tempering additive for use in such a process.

BACKGROUND OF THE INVENTION

GB 1564363 (Dynamit Nobel AG: 1975) describes how molten chocolate fats are often difficult to solidify from a supercooled melt and while solidification can be accelerated by the application of steep temperature gradients, this can result in the fat crystallizing in one or more alternative crystalline forms (polymorphs).

Tempering accelerators exemplified for use in chocolate making are described in EP 0,294,974 (Fuji Oil Co.) and in a paper of N. Matsui, *Crystallization and Polymorphism of Fats and Fatty Acids*, ed by Garti, N. and Sato, K. (NY 1988) pp. 410–412.

While some of these forms may have properties appropriate for the envisaged use of the fat in confectionery, other crystalline forms do not have the desired properties and crystallization in these forms should be avoided. As a solution to this problem GB 1564363 proposes the use of a crystalline powder-form composition which is dispersed in the supercooled cocoa butter melt to promote the desired crystal habit, and suggests that this should be selected from "mono-acid triglycerides", "symmetrical triglycerides" and mixtures thereof which comprise saturated fatty acids of carbon chain length of at least 10 carbon atoms, 16 and 18 carbon chains being preferable.

SUMMARY OF THE INVENTION

It is thus an object of the invention to provide a supercooled melt used in the process of making a liquid emulsion spread. The melt comprises a substantially liquid fat blend containing an oil liquid at 10° C. as the bulk of the solid fat components and 2–10 wt % of a 2-elaidoyl triacylglycerol. A method of making such a spread is also described wherein 2 to 10 wt %, preferably 5 to 20 wt % of a 2-elaidoyl triacylglycerol is incorporated as a tempering accelerator in a blend of spread fats.

DETAILED DESCRIPTION OF PREFERRED EMBODIMENTS

For the purposes of the present specification, triacylglycerides (TAGs) capable of accelerating the rate of crystallization of fats from a supercooled melt will be referred to as "tempering accelerators".

According to the invention, oils and fats are described by reference to the fatty acid composition of their constituent tri-acyl glycerides (TAGs), both as regards the length of the carbon-chain in the constituent fatty acids and the positional isomerism on the glycerol backbone. For the type of fatty acids it is convenient to use the notations given below in table 1, as used throughout this specification:

TABLE 1

| | |
|---|---|
| S = stearic acid, | (18-carbon) |
| P = palmitic acid, | (16-carbon) |
| M = lauric fats, | (12–14 carbon) |
| H = stearic + palmitic | (16–18 carbon) |
| O = oleic acid, | (18 carbon mono-unsat.) |
| L = linoleic acid, | (18 carbon di-unsat.) |
| T = mono-trans fat, and | (12–18 carbon mono-unsat) |
| E = Elaidic acid | (18 carbon mono-trans) |
| U = oleic + linoleic. | (18 carbon unsaturated) |
| F = saturated fat | (12–18 carbon saturate) |

In order to complete the notation the letter 'X' is used to indicate a fatty acid which is either saturated or cis or trans unsaturated and of chain length 8–20 carbons.

Using this notation, it is convenient to write tri-palmitoyl glycerol as PPP, and to indicate the two positional isomers of say an oleic acid substituted PPP as PPO and POP. XXX is of course the general definition of the types of fats used in foodstuffs: as there can be no positional ambiguity this may be written X3.

The TAG tempering accelerators described in GB 1,564, 363 NOBEL are characterized as being, for example, SPS (1,3-distearoyl-2-palmitoyl glycerol) and PSP (1,3-dipalmitoyl-2-stearoyl glycerol). In generic terms NOBEL discloses the use of FFF TAGs in which at least one F represents a different saturate from at least one other F.

The effectiveness of another chocolate tempering accelerator is disclosed in the paper of N. Matsui, Supra, wherein it is stated that PEP in binary mixture with POP increases the rate of transformation from the unstable polymorphs of POP to more stable polymorphs, and that PEP accelerates the crystallization of cocoa butter.

A third tempering accelerator exemplified for chocolate making describe in EP 0294974 A (to Fuji Oil Company, Limited), states that a powdery tempering accelerator for use in chocolate can comprise a 1,3-saturated-2-unsaturated (FUF) TAG comprising a total carbon content in the constituent fatty acid residues of 50–56 carbon atoms. In these compositions the preferred accelerator comprises SOS.

The processability of a margarine or other edible spread fat blends and the properties of the resulting products are to a large extent determined by the crystallization behavior of the fat blend. The latter in turn is mainly controlled by the TAG composition of the fat blend. The TAG compositions of margarine or other spread fat blends is very different from the composition of fat blends employed in chocolate manufacture and it is not to be expected that a tempering accelerator from one art will be applicable in the other.

However, problems of delayed crystallization are known in the art of margarine or other spread manufacture, in particular, it is common knowledge in margarine blend formulation that interesterification of TAGs quite often results in slower crystallizing fat blends and often fat blends which are impractically or inconveniently slow to crystallize.

We have now determined that the crystallization of margarine fats from a supercooled melt can be accelerated by the use of a TAG having a trans fatty acid at the 2-position, preferably a 1,3-saturated-2-trans-unsaturated (FTF) TAG as a tempering accelerator. Using the above mentioned notation these include the XTX TAGs and in particular the HTH TAGs where H is a stearic or a palmitic acid residue.

Generally, the trans fatty acid chain is an elaidic acid residue: i.e. in the above-mentioned notation the accelerator comprises HEH TAGs. Many margarine fat blends contain trans fatty acids as plasticity improvers, although the use of high levels of trans fatty acids is becoming unpopular for nutritional reasons. In trans containing fat blends TAGs with elaidic acid (E) on the 2-position of the glycerol accelerate crystallization: other trans containing TAGs, without this feature have little or no beneficial effect on crystallization rate.

Typically, the 1,3 position residues are H fats: as HTH, preferably palmitic acid residues: as PTH or as PTP. The accelerating effect of the TAGs with E on the 2 position is more pronounced if the melting point of the TAG is higher hence PEP is preferred to PEE, as PEP has the higher melting point. Moreover, many margarine fat blends contain so called H2U TAGs (HUH and HHU). In fat blends with high H2U content and low HUH/HHU ratio an acceptable accelerating effect is found for TAGs with trans on the 2-position and at least one palmitic acid residue on the 1–3 positions, i.e PTH and PTT.

Preferably the tempering accelerator comprises PEP. It is observed that PEP is not only functional in the presence of trans fats (due to the E on the 2-position), but also gives acceptable results with margarine fat blends containing H2U TAGs.

In an embodiment of the invention the 1,3-saturated-2-trans-unsaturated (FTF) TAG tempering accelerator is added at a level such that it comprises at least 2% by weight of total blend, more preferably at least 5% wt. In general levels of the tempering accelerator should not be greater than 10%. With PEP, transition times from liquid to solid phase can be decreased by a factor 4 at a 5% inclusion level.

Thus, a supercooled melt used in the process of making a liquid edible emulsion spread comprises a substantially liquid fat blend containing an oil liquid at 10° C. as the bulk of the solid fat component and 2–10 wt % of a 2-elaidoyl triacylglycerol.

The effects of trans containing TAGs on the N-line (solids index at given temperature) are:

SES increases N10, N20, N30 and N35. The effects on N35 and N30 are larger in blends rich in stearic acid.

PEP increases N10, N20 and to a smaller extent N30, and hardly affects N35.

EXAMPLES

In order to illustrate the present invention, moderately pure synthetic TAG-concentrates were used to compose synthetic fat blends of specified composition. The compositions (Table 3) were chosen such, that they contained 2% H3 ,about 25% of the main TAG (SOS,SSO,POP,PPO or EEE) and further only liquid oils (see Table 2 for analysis). Mono and diglyceride content were kept constant. (mono: 0.1%, di:1–2%) as this could otherwise have affected the properties of the fat blend.

As a consequence of these somewhat peculiar formulation requirements, the fat blends are rather complex as compared with conventional edible spread fat blends. However, the N-lines (solids index at given temperature) of these basic blends and of the basic blends with their additions are all in the range of possible margarine and other edible spread blends: typically N10: 20-40, and N35: 0-4.

N-lines, TAG-composition and blend composition for the blends 'SOS', 'SSO', 'POP', 'PPO' and 'EEE' are given in Table 2 (N-lines and TAG composition) and Table 3 (composition of fat blend) below as described in Ng, W. et al. "A Kinetic Study on Isothermal Crystallization of Palm Oil by Solid Fat Content Measurements, JAOCS, V. 71, #10, October 1994, p. 1135–1139, herein incorporated by reference.

TABLE 2A

N-lines of the basic blends (%)

| Fat blend | Main TAG | N10 | N20 | N30 | N35 |
|---|---|---|---|---|---|
| I | SOS | 35.5 | 21.5 | 4.4 | 2.2 |
| II | SSO | 35.5 | 20.1 | 3.8 | 1.7 |
| III | POP | 24.7 | 5.7 | 0.5 | 0.0 |
| IV | PPO | 31.2 | 11.4 | 1.1 | 0.0 |
| V | EEE | 28.3 | 20.3 | 9.1 | 3.1 |

TABLE 2B

TAG-analysis of the basic blends (%)

| Fat blend | Main TAG | H3 | HOH | HHO | EEE | HHL | HLH | HOO + REST |
|---|---|---|---|---|---|---|---|---|
| I | SOS | 2.4 | 29.4 | 3.8 | 0.0 | 4.50 | 11.1 | 48.8 |
| II | SSO | 2.0 | 10.3 | 15.0 | 0.0 | 3.8 | 12.3 | 56.6 |
| III | POP | 2.1 | 28.3 | 3.2 | 0.0 | 6.1 | 9.4 | 50.9 |
| IV | PPO | 2.4 | 12.3 | 11.4 | 0.0 | 4.2 | 11.6 | 58.1 |
| V | EEE | 2.2 | 0.5 | 1.7 | 27.0 | 3.2 | 4.5 | 62.5 |

TABLE 3

Composition of fat blends:

Fat Blend I with SOS as main TAG composed of:

SOS:
- 0.8% Sunflower hydrogenated to m.p 69° C.
- 28.6% Dry fractionated shea stearin
- 5.0% Wet mid-frac. of (interesterified 40% sunflower oil hydrogenated to 60° C./60% olive oil)
- 18.6% Wet foot-frac. of (interesterified 40% sunflower oil hydrogenated to 60° C./60% olive oil)
- 47.0% Sunflower oil.

Fat blend II with SSO as main TAG composed of:

SSO:
- 0.9% Sunflower hydrogenated to m.p. 69° C.
- 3.0% Dry fractionated shea stearin
- 34.5% Wet mid-frac of (interesterified 40% sunflower oil hydrogenated to 60° C./60% olive oil)
- 5.0% Wet foot-frac. of (interesterified 40% sunflower oil hydrogenated to 60° C./60% olive oil)
- 56.6% Sunflower oil.

Fat blend III with POP as main TAG composed of:

POP:
- 1.1% Wet frac palm stearin hardened to m.p. 58° C.
- 28.6% Wet mid-frac. palm oil
- 19.0% Wet foot-frac palm oil
- 51.4% Sunflower oil.

Fat blend IV with PPO as main TAG composed of:

PPO:
- 1.3% Wet frac palm stearin hardened to m.p 58° C.
- 3.0% Wet mid-frac. palm oil.
- 34.4% Wet foot-frac. of (interesterified 40% stearin fraction of palm oil obtained by wet fraction action 60% olive oil)
- 2.0% Wet foot-frac. palm oil
- 59.3% Sunflower oil Fat blend V with EEE as main TAG composed of:

EEE:
- 2.0% Sunflower hydrogenated to m.p. 69° C.,
- 27.0% EEE (synthetic triglyceride)
- 71.0% Sunflower oil.

The only synthetic TAG used in the above-described general formulations was the EEE TAG. However, SES, SSE, PEP, PPE, ESE, SEE, PEE and EPE TAGs were obtained by synthesis for use in the examples described below. The analyses of the synthetic TAGs showed that all had a purity of at least 90%, the impurities being very small amounts of other trans containing TAGs.

Isothermal crystallization was examined using the following experimental procedure. The molten fatblend was drawn from a 100 g premix vessel, through a microvotator A-unit (RTM) operating at a throughput of about 10 kg/hr (2.78 g/s). The well known purpose of the A-unit is to cool fat blends and emulsions in spreads manufacture. Subsequent to passage through the A-unit, the fatblend was remelted in a small tube heat exchanger and recycled into the premix vessel. This cycling system provided a continuous supply of supercooled fat from the A-unit.

For measurement a sample was drawn off after the A-unit, into an NMR-tube and placed into a thermostated pulse NMR. Solids measurements were taken at 5-15 second intervals under the supervision of a computer program (in BASIC on Hewlett Packard 200-300 series computer). Tests showed that during crystallization the sample temperature in the NMR tube was constant within 0.5° C. Only very fast crystallizing blends showed a minor increase in temperature (<2° C.) during 15-20 secs. The time/solids curve was used to calculate the so-called 'transition time' for the fat blend. 'Transition time', as used herein, is defined as the time difference after which the rate of crystallization of the supercooled fat reaches a maximum. This is typically close to the time after which half of the induced crystallization has occurred.

COMPARATIVE and ILLUSTRATIVE EXAMPLES

Isothermal crystallization behavior was investigated for the formulations given in examples 1-5. During the trials the composition was always adapted such, that the H3-content of the blend remained at about 2%, irrespective of the additions.

Transition times were measured after supercooling to 10°-12° C.

EXAMPLE 1

In this example the 'parent blend' was 'SOS' as mentioned in Table 2 and Table 3 above. Without additions the SOS-rich Fat Blend F contains 2% of the HHH TAG, and the measured transition time was 578s (all times are given in seconds). Successive modifications of the fat blend were made with additions of essentially pure synthetic TAGs, to give the transition times listed to the right of the additions.

With additions the following results were obtained:

| SOS-Rich-blend I: | |
|---|---|
| pure(=2% H3), | 578 |
| with 3% PPP and 3% SSS: | 570 and 570 |
| +1%, 2% and 5% SES: | 350, 350 and 124 |
| +1%, 2% and 5% SSE: | 600, 570 and 577 |
| +1%, 2% and 6% PEP: | 562, 488 and 118 |
| +1%, 2% and 5% PPE: | 563, 578 and 533 |

From these figures it can be seen that a marked reduction in transition time is obtained with additions of PEP and SES, whereas no effective improvement in transition time is obtained with additions of SSE and PPE.

EXAMPLE 2

Example 1 was repeated with the SSO-rich Fat Blend II. The following results were obtained:

| SSO-rich blend II: | |
|---|---|
| pure(=2% H3), | 3300 |
| +2% and 5% PEP: | 2100 and 400 |
| +2% and 5% PPE: | 3600 and 2160 |

From these figures it can be seen that PEP gives a very marked improvement in transition time whereas PPE gives a much lesser improvement.

EXAMPLE 3

Example 1 was repeated with the POP-rich Fat blend III. The following results were obtained:

| POP-rich blend III: | |
|---|---|
| pure(=2% H3), | 947 |
| +1%, 2% and 5% SES: | 350, 311 and 281 |
| +1%, 2% and 5% SSE: | 900, 414 and 1100 |
| +1%, 2% and 5% PEP: | 696, 400 and 148 |
| +1%, 2% and 5% PPE: | 1332, 949 and 474, |
| +2%, 5% and 10% SEE: | 330, 311 and 252, |
| +2%, 5% and 10% ESE: | 844, 660 and 660 |
| +2%, 5% and 10% PEE: | 530, 510 and 450 |
| +2%, 5% and 10% EPE: | 725, 822 and 1100 |
| +5%, 10% and 15% EEE: | 874, 771 and 725 |

From these figures it can be seen that SES, PEP and PEE all show a marked improvement, with PEP being by far the most marked.

EXAMPLE 4

Example 1 was repeated with the PPO-rich Fat blend IV. The following results were obtained:

| PPO-rich blend IV: | |
|---|---|
| pure(=2% H3), | 696 |
| +2% and 5% SES: | 644 and 540 |
| +2% and 5% SSE: | 840 and 770 |
| +1%, 2% and 5% PEP: | 439, 191, and 83 |
| +1%, 2% and 5% PPE: | 481, 508 and 689 |
| +2%, 5% and 10% SEE: | 675, 751 and 551 |
| +2%, 5% and 10% ESE: | 570, 640 and 530 |
| +2%, 5% and 10% PEE: | 320, 250 and 245 |
| +2%, 5% and 10% EPE: | 690, 680 and 785 |

From these results it can be seen that PEP has the most marked effect, and PEE is better than EPE.

EXAMPLE 5

Example 1 was repeated with the EEE-rich Fat blend V. The following results were obtained:

| EEE-rich blend V: | |
|---|---|
| pure(=2% H3), | 219 |
| with 5% H3, | 220 |
| +1%, 2% and 5% PEP: | 213, 180 and 90 |
| +1%, 2% and 5% PPE: | 226, 260 and 333 |
| +1%, 2% and 4% SSE: | 208, 219 and 250 |
| 10% and 15% PEE: | 219 and 188 |

From these results it can again be seen that PEP is the most effective tempering accelerator.

We claim:

1. A method of making an edible emulsion spread comprising the steps of:
   (a) selecting a blend of spread fats;
   (b) incorporating from 2 to 10 wt. % of a 2-elaidoyl triacylglycerol as a tempering accelerator in the blend of fats, provided that at least one of 1,3 position residues of the 2-elaidoyl triacylglycerol is a palmitic or stearic fatty acid residue; and
   (c) forming an edible emulsion spread having N-line values at 10° C. of 20–40 and at 35° C. of 0–4.

2. A process according to claim 1, wherein the 2-elaidoyl triacylglycerol is added in powder form.

3. A process according to claim 1, wherein at least one of the 1,3 position residues is a palmitic acid residue.

4. A process according to claim 1, wherein the 2-elaidoyl triacylglycerol is selected from the group consisting of 1,3-depalmitoyl 2-elaidoyl triacylglycerol (PEP) and 1,3-distearoyl 2-elaidoyl triacylglycerol (SES).

5. A process according to claim 1 wherein the 2-elaidoyl triacylglycerol is 1,3-dipalmitoyl 2-elaidoyl glycerol.

6. A supercooled melt used in the process of making an edible emulsion spread comprising:
   (a) a substantially liquid spread fat blend containing an oil liquid at 10° C. as the bulk of the solid fat components; and
   (b) 2–10 wt. % of a 2-elaidoyl triacylglycerol as a tempering accelerator provided that at least one of 1,3 position residues of the 2-elaidoyl triacylglycerol s a palmitic or stearic fatty acid residue, wherein a liquid emulsion spread blend having N-line values at 10° C. of 20–40 and at 35° C. of 0–4 is obtained.

* * * * *